(12) United States Patent
Mutz et al.

(10) Patent No.: US 9,830,443 B2
(45) Date of Patent: Nov. 28, 2017

(54) DEVICE AND METHOD FOR CONTROLLING ACCESS TO AT LEAST ONE MACHINE

(71) Applicant: BLINKSIGHT, Colombelles (FR)

(72) Inventors: Stéphane Mutz, Cuverville (FR); Matthieu Mutz, Caen (FR)

(73) Assignee: BLINKSIGHT (FR)

( * ) Notice: Subject to any disclaimer, the term of this patent is extended or adjusted under 35 U.S.C. 154(b) by 0 days.

(21) Appl. No.: 14/904,472

(22) PCT Filed: Jul. 10, 2014

(86) PCT No.: PCT/EP2014/064798
§ 371 (c)(1),
(2) Date: Jan. 12, 2016

(87) PCT Pub. No.: WO2015/004226
PCT Pub. Date: Jan. 15, 2015

(65) Prior Publication Data
US 2016/0147988 A1    May 26, 2016

(30) Foreign Application Priority Data

Jul. 12, 2013 (FR) ...................................... 13 56914

(51) Int. Cl.
*H04L 29/06* (2006.01)
*G06F 21/35* (2013.01)
(Continued)

(52) U.S. Cl.
CPC ............ *G06F 21/35* (2013.01); *G06F 21/305* (2013.01); *H04L 63/107* (2013.01); *H04W 4/008* (2013.01);
(Continued)

(58) Field of Classification Search
CPC ....................................................... G06F 21/35
See application file for complete search history.

(56) References Cited

U.S. PATENT DOCUMENTS 7,378,939 B2 * 5/2008 Sengupta ................ H04M 1/67
340/5.53
7,515,048 B1    4/2009 Bhattiprolu et al.
(Continued)

FOREIGN PATENT DOCUMENTS

EP    1653759 A1    5/2006
EP    1760621 A1    3/2007
(Continued)

OTHER PUBLICATIONS

International Search Report and Written Opinion for Application No. PCT/US2014/064798 dated Feb. 12, 2015.

*Primary Examiner* — Shawnchoy Rahman
(74) *Attorney, Agent, or Firm* — Lerner, David, Littenberg, Krumholz & Mentlik, LLP

(57) ABSTRACT

The invention relates to a device for controlling access to a machine, comprising a portable object having a signal transmission member and a device for locking and unlocking a machine. The member for controlling the device is capable of triggering, once the second transceiver of the device has received the signal, the transmission of a signal to a wireless radio receiver supported by the portable object, and comprises a control member for triggering, when the wireless radio receiver has received the second signal, the transmission of a signal, the control member being connected to a calculator member for computing a distance between the portable object and the device using the signals, the portable object comprising a member for independently powering the transmission member, the receiver and the control member thereof. The device comprises a further calculator member for computing an incoming angle of the first signal and/or the third signal such as to trigger, when the angle is within a given angular range and when the distance is lower than a predetermined value, the unlocking of the (Continued)

Figure 1:
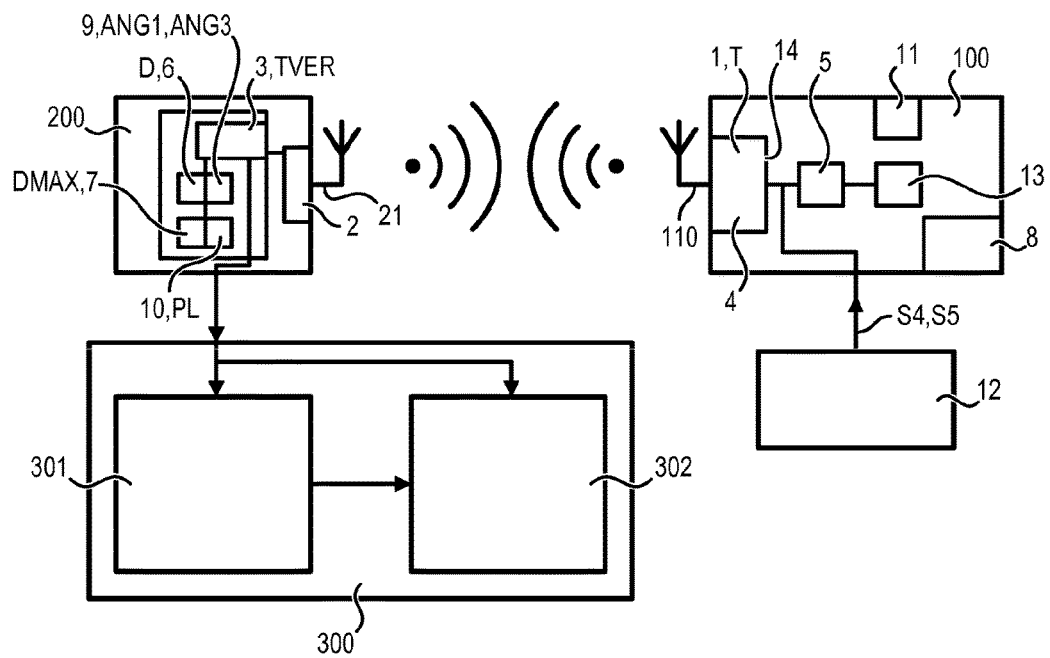

machine and to trigger, when the distance is higher than a predetermined value, the locking of the machine.

16 Claims, 1 Drawing Sheet

(51) Int. Cl.
    *H04W 4/00*         (2009.01)
    *H04W 12/08*       (2009.01)
    *G06F 21/30*        (2013.01)
    *H04W 4/04*         (2009.01)
    *H04W 4/02*         (2009.01)
    *G07C 9/00*         (2006.01)

(52) U.S. Cl.
    CPC ........... *H04W 4/043* (2013.01); *H04W 12/08* (2013.01); *G07C 9/00007* (2013.01); *G07C 2209/63* (2013.01); *H04W 4/02* (2013.01)

(56) References Cited

U.S. PATENT DOCUMENTS

| | | | |
|---|---|---|---|
| 8,467,770 B1 * | 6/2013 | Ben Ayed | H04L 63/107 455/41.1 |
| 8,595,810 B1 * | 11/2013 | Ben Ayed | H04L 63/0815 713/168 |
| 2005/0221798 A1 | 10/2005 | Sengupta et al. | |
| 2007/0037614 A1 | 2/2007 | Rosenberg | |
| 2007/0164847 A1 | 7/2007 | Crawford et al. | |
| 2008/0018475 A1 | 1/2008 | Breed et al. | |
| 2009/0100384 A1 | 4/2009 | Louch | |
| 2011/0093958 A1 | 4/2011 | Devictor | |
| 2011/0115742 A1 | 5/2011 | Sobel et al. | |
| 2011/0267280 A1 | 11/2011 | De Mers et al. | |
| 2012/0324384 A1 | 12/2012 | Cohen et al. | |
| 2012/0327123 A1 | 12/2012 | Felt | |

FOREIGN PATENT DOCUMENTS

| | | |
|---|---|---|
| EP | 2200375 A2 | 6/2010 |
| FR | 2942894 A1 | 9/2010 |
| FR | 2947207 A1 | 12/2010 |
| JP | 2006274762 A | 10/2006 |
| JP | 2010185263 A | 8/2010 |
| KR | 20100114410 A | 10/2010 |
| WO | 2006105088 A2 | 10/2006 |
| WO | 2007052117 A1 | 5/2007 |
| WO | 2011063025 A2 | 5/2011 |
| WO | 2011130582 A1 | 10/2011 |
| WO | 2013084030 A1 | 6/2013 |

* cited by examiner

DEVICE AND METHOD FOR CONTROLLING ACCESS TO AT LEAST ONE MACHINE

CROSS REFERENCE TO RELATED APPLICATIONS

The present application is a national phase entry under 35 U.S.C. §371 of International Application No. PCT/EP2014/064798, filed Jul. 10, 2014, published in French, which claims priority from French Patent Application No. 1356914, filed Jul. 12, 2013, the disclosures of which are incorporated by reference herein.

The invention relates to a device and a method for controlling access to at least one machine.

A field of application of the invention relates to machines which may be a computer, a digital tablet, a mobile telephone, a server, a computer memory, a data storage device.

The protection of sensitive information or devices is currently growing in importance. Because they often contain sensitive data, computers used daily by most people need to be locked to prevent data theft or malevolent use. The use of many other equipments must be reserved to qualified and authorized personnel.

There are many more or less practical and robust access control systems on the market. In most cases they are based on authorized users knowing a secret such as a password. With the increase in technological capacities, passwords are becoming more and more vulnerable to hacking. From another viewpoint, more complex passwords are difficult to remember and result in creating other security holes (written passwords to be kept on the person, known phrases, etc.).

There are other systems such as biometric systems or of smart card type for resolving some weaknesses, but fail to address an essential point. If they enable to unlock a system when a user has to access it, they do not enable to cause automatic and secure locking of the system when the operator moves away, without needing his intervention (withdrawal of card, triggering of the manual lock). Very often, the system remains accessible during a variable time period for reasons of comfort of use, causing a proven security risk.

Document U.S. Pat. No. 7,515,048 describes a system in which a computer mobile is fitted with an RFID transceiver transmitting a signal to an RFID transmitter which can be carried via the wallet or chain by a person, and which, when it has detected this signal, sends back a response signal to the RFID transceiver, which in the presence of this response signal then unlocks the computer. If the RFID transceiver does not detect the response signal, it then locks the computer.

Document US-A-2008/00 18 475 relates to a device for location of an RFID label provided on an object in a storage space of a vehicle, which comprises antennas to transmit an interrogation signal of the RFID label, which responds by sending back a signal to the antennas to deduce position interrogation information from the RFID label.

Document EP-A-1 760 621 describes a device comprising near a monitor a sensor detecting the identifier of an RFID label borne by a person, the sensor being combined with a position-tracking device, such as for example a GPS system, which defines a location of the person and a perimeter around the monitor. When an unauthorized person enters this perimeter, a monitor controller compares a level of security associated with the identifier with security criteria to prevent presenting information on the monitor to an unauthorized person in some cases.

Document US-A-2011/00 93 958 describes a device for preventing unauthorized access to data stored on mobile apparatus such as for example a mobile telephone or a USB drive, by being fitted with a wireless communication system verifying the presence of a device nearby to authorise or not authorise a function by means of a card or an RFID tag detected by an RFID device.

Document EP-A-1 653 759 describes a device in which an accessory device sends via wireless communication means a communication signal to a mobile radiotelephony terminal. The mobile radio terminal comprises locking means adapted to block at least one function provided on the mobile radio terminal following reception of a communication signal representing information on distance between the mobile radio terminal and the accessory device exceeding a reference distance value or following non-reception of a communication signal, indicating that the mobile radio terminal and the accessory device are inside the reference distance relative to each other. In one case the mobile radio terminal comprises means for estimation of the distance on the basis of the intensity of the communication signal received from the accessory device or, in another case, a transmitter of an interrogation signal to a transponder target provided on the accessory device and adapted to respond to the interrogation signal via a return signal sent to the mobile radio terminal. In this latter case, the interrogation signal is mixed with the return signal in the mobile radio terminal to measure the distance between the mobile radio terminal and the accessory device.

There are other devices which use the Bluetooth function (registered trade mark) of a mobile telephone.

None of the above systems can make a reliable response to automatic locking/unlocking of equipment during departure or arrival of an authorized operator, and especially not document EP-A-1 653 759, which remains vulnerable to abusive attempts at access to the machine in the presence of the authorized user close by without the latter being aware or when in environments where the authorized user is surrounded by many people.

Consequently, the invention aims to raise the security level of the access control device.

The aim of the invention is to provide a method and an access control device to at least one machine, eliminating the disadvantages of the prior art.

For this purpose, a first subject matter of the invention is a device for controlling access to at least one machine, the device comprising:
  a portable object, which is separate from the machine, which is intended to be borne by a person and which comprises at least one first transmission member capable of transmitting via a wireless radio link a first signal,
  a device for locking and unlocking of the machine, comprising:
    a second wireless radio transceiver, capable of receiving the first signal, and
    a third control member, which is connected to the second wireless radio transceiver and which is capable of causing an action of unlocking of the machine,
  characterized in that the third control member is capable of causing, when the second transceiver has received the first signal, transmission of a second signal by the second wireless radio transceiver to a fourth wireless radio receiver borne by the portable object, capable of receiving the second signal, the portable object comprises a fifth control member, which is connected to the first transmission member and to the fourth wireless radio receiver to cause, when the fourth wireless radio receiver has received the second signal, transmission of a third signal by the first transmission member to the second wireless radio transceiver, capable of receiving the third signal, the third control member and/or fifth control member being connected to a sixth means of calculation of a distance between the portable object and the device for locking and unlocking of the machine from the second and third signals and/or from the first and second signals, and/or from the first and third signals, the sixth means of calculation of the distance being connected to a seventh comparison means for comparison of the distance having been calculated to a prescribed value of distance, the seventh comparison means being connected to the third control member to cause, when the seventh comparison means has determined that the distance having been calculated is less than the prescribed value of distance, the action of unlocking of the machine, and to cause, when the seventh comparison means has determined that the distance having been calculated is greater than the prescribed value of distance, an action of locking of the machine, the portable object comprising an eighth member for autonomously supplying power to the first transmission member, to the fourth wireless radio receiver and to the fifth control member.

The device according to the invention offers an increased level of security. It is transmission by the portable object of the first signal which wakes up the device for locking and unlocking of the machine. In this way, the locking and unlocking device as well as the machine do not have to send signals of interrogation of an object borne by the user, avoiding fraud in locking and unlocking devices known from the prior art due to detection of this interrogation signal transmitted regularly by these known locking and unlocking devices. Also, this avoids having to leave the portable object in reception mode, which takes a lot of power.

According to an embodiment of the invention, the device for locking and unlocking of the machine comprises a ninth means for calculation of an angle of arrival of the first signal and/or of the third signal and a tenth comparison means for comparison of the angle of arrival having been calculated to at least one prescribed angular range, the seventh comparison means and the tenth comparison means being connected to the third control member to cause, when the tenth comparison means has determined that the angle of arrival having been calculated is in the prescribed angular range and when the seventh comparison means has determined that the distance having been calculated is less than the prescribed value of distance, the action of unlocking of the machine, and to cause, when the tenth comparison means has determined that the angle of arrival having been calculated is not in the prescribed angular range and/or when the seventh comparison means has determined that the distance having been calculated is greater than the prescribed value of distance, an action of locking of the machine.

According to an embodiment of the invention, the machine comprises at least one display screen, the prescribed angular range is comprised in an area located in front of the display screen.

According to an embodiment of the invention, the prescribed angular range corresponds to an angular sector of vision of the display screen.

In this way, the device best controls access to the machine by authorising unlocking only in the prescribed angular range relative to this machine in addition to a distance less than the prescribed value of distance. The device ensures prevention of access to the machine by locking it, when for example the user carrying the portable object cannot see the operation of the machine and when the user cannot determine whether the result of this operation of the machine is disclosure of critical information sent by the machine to unauthorized third-parties, and this when this user authorized is less than the prescribed distance from the machine. The device responds to those special situations where the user cannot control or see what his machine is displaying, for example when it is close enough to the machine (less than the prescribed value of distance) but not to the side where he can see what his machine is displaying and where however other unauthorized people can see what the machine is displaying. In this way, the invention ensures better discretion. The invention enables unlocking of the machine only when the user carrying the portable object is in the prescribed range less than the prescribed value of distance, to ensure that he himself can visually control what the machine is displaying or divulging and control the people who can be in the prescribed angular range. In this way, the invention resolves the above problem not resolved by document EP-A-1 653 759 and prevents abusive attempts at access to the machine in the presence of the authorized user.

According to an embodiment of the invention, the device for locking and unlocking of the machine comprises the sixth means for calculation of the distance between the portable object and the device for locking and unlocking of the machine from second and third signals, as well as the seventh comparison means for comparison of the distance having been calculated to the prescribed value of distance.

According to an embodiment of the invention, the portable object comprises the sixth means for calculation of the distance between the portable object and the locking and unlocking device of the machine from the first and second signals.

According to an embodiment of the invention, the portable object also comprises the seventh comparison means for comparison of the distance having been calculated to the prescribed value of distance, capable of determining a comparison result indicating either that the distance having been calculated is less than the prescribed value of distance, or that the distance having been calculated is greater than the prescribed value of distance, the seventh comparison means being connected to the first transmission member so that the first transmission member transmits in the third signal the comparison result, the third control member being capable of causing, when the second wireless radio transceiver has received in the third signal the comparison result indicating that the distance having been calculated is less than the prescribed value of distance, the action of unlocking of the machine.

According to an embodiment of the invention, the device for locking and unlocking of the machine comprises the sixth means for calculation of the distance between the portable object and the device for locking and unlocking of the machine from the first and third signals, as well as the seventh comparison means for comparison of the distance having been calculated to the prescribed value of distance.

According to an embodiment of the invention, the third control member is capable of causing, in response to the absence of first signal and/or of third signal received by the second transceiver during a prescribed time or in the event of absence of signal during a time period, an action of locking of the machine.

According to an embodiment of the invention, the first transmission member is arranged to transmit the first signal permanently according to time intervals.

According to an embodiment of the invention, the prescribed time is greater than each transmission time interval of the first signal by the first transmission member and less than two or more consecutive transmission time intervals of the first signal by the first transmission member. According to an embodiment of the invention, the first signal and/or the second signal and/or the third signal comprises a first identification identifying the portable object and/or the person having to carry this portable object and/or the machine and/or at least one authorized user of the machine.

According to an embodiment of the invention, the first signal comprises a first identification identifying the portable object and/or the person having to carry this portable object, the second signal comprises a second identification identifying the machine, and the third signal comprises the first identification and the second identification.

According to an embodiment of the invention, the device for locking and unlocking of the machine comprises a ninth means for calculation of an angle of arrival of the first signal and/or of the third signal and a tenth comparison means for comparison of the angle of arrival having been calculated at least one prescribed angular range, the tenth comparison means being connected to the third control member to cause, when the tenth comparison means has determined that the angle of arrival having been calculated is in the prescribed angular range and when the seventh comparison means has determined that the distance having been calculated is less than the prescribed value of distance, the action of unlocking of the machine, and to cause, when the tenth comparison means has determined that the angle of arrival having been calculated is not in the prescribed angular range and/or when the seventh comparison means has determined that the distance having been calculated is greater than the prescribed value of distance, the action of locking of the machine.

According to an embodiment of the invention, the machine comprises at least one display screen, the prescribed angular range is comprised in an area located in front of the display screen.

According to an embodiment of the invention, the first transmission member is arranged to transmit the first signal omnidirectionally.

According to an embodiment of the invention, the portable object comprises a first sensor for detection of the presence of a person carrying the portable object, the fifth control member and/or the first transmission member being connected to the first sensor to send to it, when the first sensor has detected that the portable object is not borne by a person, an signal for inactivation of the first transmission member so that the latter no longer transmits the first signal.

According to an embodiment of the invention, the portable object comprises a second detector of movement of the portable object, the fifth control member being connected to the second detector of movement of the portable object to cause, when the second detector of movement of the portable object has detected movement of the portable object, transmission of the first signal.

According to an embodiment of the invention, the locking action comprises a data erasing action.

A second subject matter of the invention is a method for controlling access to at least one machine, wherein:

a portable object, which is separate from the machine, which is intended to be borne by a person and which transmits via at least one first transmission member via a wireless radio link a first signal, a second wireless radio transceiver provided with a device for locking and unlocking of the machine receives the first signal, characterized in that the first transmission member transmits the first signal, a third control member, which is connected to the second wireless radio transceiver causes, when the second transceiver has received the first signal, the transmission of a second signal by the second wireless radio transceiver to a fourth wireless radio receiver borne by the portable object, capable of receiving the second signal, a fifth control member of the portable object, which is connected to the first transmission member and to the fourth wireless radio receiver, causes, when the fourth wireless radio receiver has received the second signal, the transmission of a third signal by the first transmission member to the second wireless radio transceiver, the second wireless radio transceiver, receives the third signal, the third control member and/or fifth control member being connected to a sixth means for calculation of a distance between the portable object and the device for locking and unlocking of the machine from the second and third signals and/or from the first and second signals, the sixth means of calculation of the distance being connected to a seventh comparison means for comparison of the distance having been calculated to a prescribed value of distance, the seventh comparison means being connected to the third control member, the seventh comparison means causes, when the seventh comparison means has determined that the distance having been calculated is less than the prescribed value of distance, the action of unlocking of the machine, and causes, when the seventh comparison means has determined that the distance having been calculated is greater than the prescribed value of distance, an action of locking of the machine, an eighth supply member of the portable object autonomously supplying the first transmission member, the fourth receiver and the fifth control member with power.

According to an embodiment of the invention, the device for locking and unlocking of the machine comprises a ninth means for calculation of an angle of arrival of the first signal and/or of the third signal and a tenth comparison means for comparison of the angle of arrival having been calculated to at least one prescribed angular range, the seventh comparison means and the tenth comparison means being connected to the third control member, the seventh comparison means and the tenth comparison means cause, when the tenth comparison means has determined that the angle of arrival having been calculated is in the prescribed angular range and when the seventh comparison means has determined that the distance having been calculated is less than the prescribed value of distance, the action of unlocking of the machine, and cause, when the tenth comparison means has determined that the angle of arrival having been calculated is not in the prescribed angular range and/or when the seventh comparison means has determined that the distance having been calculated is greater than the prescribed value of distance, an action of locking of the machine.

Figure 2:
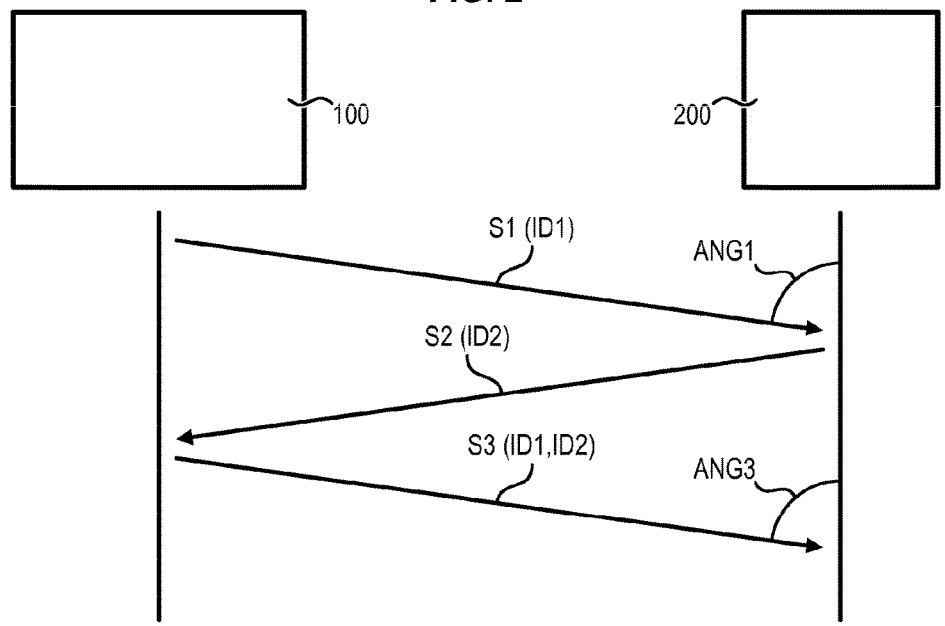

The invention will be more clearly understood from the following description given purely by way of non-limiting example in reference to the appended drawings, in which:

FIG. 1 is a modular synoptic showing the device for controlling access to at least one machine according to an embodiment of the invention, FIG. 2 schematically illustrates an exchange of signals between a portable object and a device for locking and unlocking of the machine, according to an embodiment of the invention.

In FIGS. 1 and 2, the device for controlling access to at least one machine 300 according to the invention comprises a portable object 100 and a device 200 for locking and unlocking of the machine 300.

The machine 300 can be for example a computer, fixed or portable, a digital tablet, a mobile telephone, a server, a computer memory, removable (USB drive or other) or not, a data storage device. The machine can also be an automobile.

For example, as is shown in FIG. 1, the machine 300 can comprise one or more display screens 301 and/or one or more memories 302 or data storage systems 302.

The portable object 100 is separate from the machine 300 and is intended to be borne by a person, and can be for example in the form of a badge, a bracelet, a watch, a keyring or any other object.

According to the invention, the portable object 100 comprises a first wireless radio transmission member 1, capable of transmitting via a wireless radio link a first signal S1, for example omnidirectionally.

According to an embodiment, the first wireless radio transmission member 1 transmits the first signal S1 permanently according to time intervals T.

The device 200 for locking and unlocking of the machine 300 can be for example integral with this machine 300 or be linked or connected to the latter, and this connexion can be wired or wireless via a radio link.

The device 200 for locking and unlocking of the machine 300 comprises a second wireless radio transceiver 2, capable of receiving the first signal S1, and a third control member 3, which is connected to the second wireless radio transceiver and which is capable of causing an action of unlocking of the machine 300, according to the method which will be described hereinbelow.

The third control member 3 is capable of causing, when the second transceiver 2 has received the first signal S1, transmission of a second signal S2 by the second wireless radio transceiver 2 to a fourth wireless radio receiver 4 borne by the portable object 100. This fourth wireless radio receiver 4 is capable of receiving the second signal S2.

The portable object 100 comprises a fifth control member 5, which is connected to the first transmission member 1 and to the fourth wireless radio receiver 4 to cause, when the fourth wireless radio receiver 4 has received the second signal S2, transmission of a third signal S3 by the first transmission member 1 to the second wireless radio transceiver 2. The second wireless radio transceiver 2 is capable of receiving the third signal S3.

The third control member 3 and/or fifth control member 5 is connected to a sixth calculation means 6 for calculation of a distance D between the portable object 100 and the device 200 for locking and unlocking of the machine 300 from the second and third signals S2, S3 and/or from the first and second signals S1, S2.

The sixth calculation means 6 for calculation of the distance D is connected to a seventh comparison means 7 for comparing the distance D having been calculated to a prescribed value of distance DMAX. The seventh comparison means 7 is connected to the third control member 3 to cause, when the seventh comparison means 7 has determined that the distance D having been calculated is less than the prescribed value of distance DMAX, the action of unlocking of the machine 300, and to cause, when the seventh comparison means 7 has determined that the distance D having been calculated is greater than the prescribed value of distance DMAX, an action of locking of the machine 300.

The action of unlocking of the machine enables use of it by a person. The action of locking of the machine does not enable use of it by people and corresponds for example to a standby mode, cutting of access to the members of the machine, cutting of access to a network, displaying a screen saver by the screen 301 for an action of locking of the monitor 301, cutting of access to the memory 302 for an action of locking of the memory 302. The locking action can comprise an action erasing some data or all data in the memory 302. So in this case as the user moves away from the object 100 by more than a certain distance and/or the absence of the first signal or of the object 100 over more than a certain time causes destruction of data in the memory 302, preventing a third party from accessing these data when the user is absent.

According to an embodiment, the device 200 for locking and unlocking of the machine 300 comprises a ninth calculation means 9 for calculating of an angle ANG1 of arrival of the first signal S1 and/or of an angle ANG3 of arrival of the third signal S3, and a tenth comparison means 10 for comparing of the angle of arrival ANG1 and/or ANG3 having been calculated to at least one prescribed angular range PL. The seventh comparison means 7 and the tenth comparison means 10 are connected to the third control member 3 to cause, when the tenth comparison means 10 has determined that the angle of arrival ANG1 and/or ANG3 having been calculated is in the prescribed angular range PL and when the seventh comparison means 7 has determined that the distance D having been calculated is less than the prescribed value of distance DMAX, the action of unlocking of the machine 300. The seventh comparison means 7 and the tenth comparison means 10 are connected to the third control member 3 to cause, when the tenth comparison means 10 has determined that the angle of arrival ANG1 and/or ANG3 having been calculated is not in the prescribed angular range PL and/or when the seventh comparison means 7 has determined that the distance D having been calculated is greater than the prescribed value of distance DMAX, an action of locking of the machine 300. Verification of angle can be done on S1 or S3 or both.

So the invention determines whether the authorized user of the machine is for example in front of the machine so as to unlock the machine only if the user carrying the portable object is in the prescribed angular range PL relative to the machine, which can be in front of the machine. The prescribed angular range PL is prescribed for example relative to a prescribed member of the machine, which can be a display screen 301 or other, or more generally relative to an member likely to transmit to the outside (by display or other) critical information which the authorized user does not want to necessarily divulge to third parties or which the user wants to divulge under his own control only.

The invention precisely determines the relative position of the user and of the machine to decide on locking and unlocking, by exploiting not only the distance but also the direction relative to the machine to produce a more secure system.

According to an embodiment, the prescribed angular range is comprised in an area located in front of the at least one display screen 301.

According to an embodiment, the prescribed angular range corresponds to an angular sector of vision of the display screen 301. This angular sector of vision is for example limited to the prescribed angular range PL, limited to a distance less than the prescribed value of distance DMAX.

The prescribed angular range PL can correspond for example to an angular sector of vision of the display screen 301, and can be for example $2\pi$ steradian solid angle or be 180 degrees in a horizontal plane or an angle less than 180 degrees in a horizontal plane. In this way, the machine 300 is unlocked in this case only when the person carrying the object 100 is actually in front of the display screen 301.

According to an embodiment, the locking action can be unlocked only by entry of a prescribed code on an interface of the machine or can be unlocked only by the unlocking action.

In an embodiment shown in FIG. 1, it is the device 200 for locking and unlocking of the machine 300 which has the sixth calculation means 6 for calculation of the distance D between the portable object 100 and the device 200 for locking and unlocking of the machine 300 from the second signal S2 and the third signal S3, and which also comprises the seventh comparison means 7 for comparing of the distance D having been calculated to the prescribed value of distance DMAX. For example, in this case, the sixth calculation means 6 for calculation of the distance D between the portable object 100 and the device 200 for locking and unlocking of the machine 300 calculates this distance D from the second transmission instant at which the second signal S2 is transmitted by the second transceiver 2 and from the third instant of reception at which the third signal S3 is received by the second transceiver 2.

In another embodiment shown in FIG. 1, it is device 200 for locking and unlocking 200 of the machine 300 which has the sixth calculation means 6 for calculation of the distance D between the portable object 100 and the device 200 for locking and unlocking of the machine 300 from the first signal S1 and the third signal S3, and which also has the seventh comparison means 7 for comparing of the distance D having been calculated to the prescribed value of distance DMAX. For example, in this case, the sixth calculation means 6 for calculating of the distance D between the portable object 100 and the device 200 for locking and unlocking of the machine 300 calculates this distance D from the first instant of reception at which the first signal S1 is received by the second transceiver 2 and from the third instant of reception at which the third signal S3 is received by the second transceiver 2.

In another embodiment not shown, it is the portable object 100 which has the sixth calculation means 6 for calculating of the distance D between the portable object 100 and the device 200 for locking and unlocking of the machine 300 from the first signal S1 and the second signal S2. For example, in this case, the sixth calculation means 6 for calculating of the distance D between the portable object 100 and the device 200 for locking and unlocking of the machine 300 calculates this distance D from the first transmission instant at which the first signal S1 is transmitted by the first transmission member 1 and from the second instant of reception at which the second signal S2 is received by the fourth receiver 4. The portable object 100 can also comprise in this case the seventh comparison means 7 for comparing of the distance D having been calculated to the prescribed value of distance DMAX. The seventh comparison means 7 for comparing of the distance D having been calculated to the prescribed value of distance DMAX is capable of determining a comparison result indicating either that the distance D having been calculated is less than the prescribed value of distance DMAX, or that the distance D having been calculated is greater than the prescribed value of distance DMAX. The seventh comparison means is connected to the first transmission member 1 so that the first transmission member 1 transmits the comparison result in the third signal S3. The third control member 3 is capable of causing, when the second wireless radio transceiver 2 has received in the third signal S3 the comparison result indicating that the distance D having been calculated is less than the prescribed value of distance DMAX, the action of unlocking of the machine 300. The third control member 3 is capable of causing, when the second wireless radio transceiver 2 has received in the third signal S3 the comparison result indicating that the distance D having been calculated is greater than the prescribed value of distance DMAX, the action of locking of the machine 300.

In this way, the access to the machine 300 is automatically unlocked when the person carrying the portable object 100 is less than the prescribed value of distance DMAX. This prescribed value of distance DMAX is for example pre-recorded in a memory of the device 200 and/or the portable object 100. In this way, this unlocking needs no personal intervention.

Likewise, the device according to the invention automatically locks access to the machine 300 when the person moves further away by this prescribed value of distance DMAX, without intervention on his part.

The first transmission member 1 and/or the second transceiver 2 and/or the fourth receiver 4 are for example wireless impulse radio, for example of the type ultra-wide band (UWB).

Also, the same portable object 100 can cause unlocking of several locking and unlocking devices 200 linked respectively to several machines 300. This unlocking takes place almost at the same time when the machines 300 are near each other and when their associated device 200 for locking and unlocking detects via the seventh comparison means 7 that the distance D relative to each device 200 is less than the prescribed value of distance DMAX.

In another example, unlocking of the machines 300 can be done successively when these machines 300 are arranged along a trajectory described by the person carrying the object 100, as this object 100 moves less than the prescribed value of distance DMAX relative to each device 200 for locking and unlocking 0 associated with each machine 300.

According to an embodiment, the third control member 3 is capable of causing, in response to the absence of first signal S1 and/or third signal S3 received by the second transceiver 2 during a prescribed time TVER, an action of locking of the machine 300.

In an embodiment, the first transmission member 1 and the fourth receiver 4 form part of the same transceiver 14 borne by the portable object 100.

The first wireless radio transmission member 1 comprises one or more transmission antennas 110. The wireless radio receiver 4 comprises one or more reception antennas which can be formed for example by one or more antennas 110 of the transmission member 1. The transceiver 2 comprises one or more transmission and reception antennas 21.

According to an embodiment, the prescribed time TVER is greater than each transmission time interval T of the first signal S1 by the first transmission member 1 and is less than two consecutive transmission time intervals T of the first signal S1 by the first transmission member 1.

In an embodiment, the first transmission member 1 is arranged to transmit at identical time intervals T, that is, periodically, the first signal S1. This first signal S1 is for example impulse.

According to an embodiment, the first signal S1 and/or the second signal S2 and/or the third signal S3 comprise a first identification ID1 identifying the portable object 100 and/or the person having to carry this portable object 100 and/or the machine 300 and/or at least one authorized user of the machine 300.

In the embodiment shown in FIG. 2, the first signal S1 comprises a first identification ID1 identifying the portable object 100 and/or the person having to carry this portable object 100, the second signal S2 comprises a second identification ID2 identifying the machine 300 and the third signal S3 comprises the first identification ID1 and the second identification ID2.

According to an embodiment, the portable object 100 comprises an eleventh member 11 for starting and stopping the transmission member 1 and the receiver 4.

According to an embodiment, the portable object 100 comprises a twelfth presence sensor 12 for detecting the presence of the person having to carry this object 100. When the sensor 12 detects, for example by contact, that the portable object 100 is not borne by a person, the sensor 12 generates a fourth inactivation signal S4 for inactivation of the transmission member 1 and of the receiver 4, so that the latter no longer transmit the first signal S1 and the third signal S3 and no longer receive the second signal S2. The sensor 12 comprises for example a mechanism for detection of removal, for example by contact. When the sensor 12 detects the presence of a person carrying the object 100, it does not transmit the inactivation signal S4 or transmits another fifth signal S5 activating the first transmission member 1 and the receiver 4, so that the latter transmit the first signal S1 and the third signal S3 and receive the second signal S2. It can also be necessary to reactivate, by actuating an additional activation member, for example by entering a PIN code, the first transmission member 1 and the receiver 4, so that the latter transmit the first signal S1 and the third signal S3 and receive the second signal S2.

The portable object 100 comprises an eighth supply member 8 for autonomously supplying the first transmission member 1, the fourth receiver 4, the fifth control member 5 and, when it is provided, the sensor 12 with power. The sensor 12 therefore enables to save the energy of the portable object 100.

According to an embodiment, the portable object 100 comprises a second detector 13 of movement of the portable object 100. The fifth control member 5 is connected to the movement detector 13 to cause, when this detector 13 has detected movement of the portable object 100, the transmission of the first signal S1 by the first transmission member 1. In this way, the first signal S1 is transmitted on detection of movement.

The invention claimed is:

1. A method for controlling access to at least one machine, wherein
a portable object transmits via at least one first transmitter via a wireless radio link a first signal, a second wireless radio transceiver provided with a device for locking and unlocking of the machine receives the first signal, the first transmitter transmits the first signal,
a third control member, which is connected to the second wireless radio transceiver causes, when the second wireless radio transceiver has received the first signal, transmission of a second signal by the second wireless radio transceiver to a fourth wireless radio receiver borne by the portable object, capable of receiving the second signal,
a fifth control member of the portable object which is connected to the first transmitter and to the fourth wireless radio receiver, causes, when the fourth wireless radio receiver has received the second signal, transmission of a third signal by the first transmitter to the second wireless radio transceiver,
the second wireless radio transceiver receives the third signal,
the third control member and/or fifth control member being connected to a sixth calculator member for calculation of a distance between the portable object and the device for locking and unlocking of the machine from the second and third signals and/or from the first and second signals,
the sixth calculator member for calculation of the distance being connected to a seventh comparator for comparison of the distance having been calculated to a prescribed value of distance, the seventh comparator being connected to the third control member,
an eighth supply member of the portable object autonomously supplies the first transmitter, the fourth wireless radio receiver and the fifth control member with power, the device for locking and unlocking of the machine comprising a ninth calculator member for calculation of an angle of arrival of the first signal and/or of the third signal and a tenth comparator for comparison of the angle of arrival having been calculated to at least one prescribed angular range,
the seventh comparator and the tenth comparator being connected to the third control member,
the seventh comparator and the tenth comparator cause, when the tenth comparator has determined that the angle of arrival having been calculated is in the prescribed angular range and when the seventh comparator has determined that the distance having been calculated is less than the prescribed value of distance, the action of unlocking of the machine, and cause, when the tenth comparator has determined that the angle of arrival having been calculated is not in the prescribed angular range and/or when the seventh comparator has determined that the distance having been calculated is greater than the prescribed value of distance, an action of locking of the machine.

2. The method according to claim 1, wherein the machine comprises at least one display screen, the prescribed angular range is comprised in an area located in front of the display screen.

3. The method according to claim 2, wherein the prescribed angular range corresponds to an angular sector of vision of the display screen.

4. The method according to claim 1, wherein the device for locking and unlocking of the machine comprises the sixth calculator member for calculation of the distance between the portable object and the device for locking and unlocking of the machine from the second and third signals, and the seventh comparator for comparison of the distance having been calculated to the prescribed value of distance.

5. The method according to claim 1, wherein the portable object comprises the sixth calculator member for calculation of the distance between the portable object and the device for locking and unlocking of the machine from the first and second signals.

6. The method according to claim 5, wherein the portable object also comprises the seventh comparator for comparison of the distance having been calculated to the prescribed value of distance, determining a comparison result indicating either that the distance having been calculated is less than the prescribed value of distance, or that the distance having been calculated is greater than the prescribed value of distance, the seventh comparator being connected to the first transmitter so that the first transmitter transmits in the third signal the comparison result, the third control member causing, when the second wireless radio transceiver has received in the third signal the comparison result indicating that the distance having been calculated is less than the prescribed value of distance, the action of unlocking of the machine.

7. The method according to claim 1, wherein the locking and unlocking device of the machine comprises the sixth calculator member for calculation of the distance between the portable object and the device for locking and unlocking of the machine from the first and third signals, and the seventh comparator for comparison of the distance having been calculated to the prescribed value of distance.

8. The method according to claim 1, wherein the third control member causes, in response to the absence of first signal and/or third signal received by the second wireless radio transceiver during a prescribed time, an action of locking of the machine.

9. The method according to claim 1, wherein the first transmitter transmits the first signal permanently according to time intervals.

10. The method according to claim 7, wherein the third control member causes, in response to the absence of first signal and/or third signal received by the second wireless radio transceiver during a prescribed time, an action of locking of the machine, wherein the prescribed time is greater than each transmission time interval of the first signal by the first transmitter and fewer than two consecutive transmission time intervals of the first signal by the first transmitter.

11. The method according to claim 1, wherein the first signal and/or the second signal and/or the third signal comprises a first identification identifying the portable object and/or the person having to carry the portable object and/or the machine and/or at least one authorized user of the machine.

12. The method according to claim 1, wherein the first signal comprises a first identification identifying the portable object and/or the person having to carry the portable object, the second signal comprises a second identification identifying the machine, and the third signal comprises the first identification and the second identification.

13. The method according to claim 1, wherein the first transmitter transmits the first signal omnidirectionally.

14. The method according to claim 1, wherein the portable object comprises a first sensor for detection of the presence of a person carrying the portable object, the fifth control member and/or the first transmitter being connected to the first sensor to send to it, when the first sensor has detected that the portable object is not borne by a person, a signal for inactivation of the first transmitter so that the latter no longer transmits the first signal.

15. The method according to claim 1, wherein the portable object comprises a second detector of movement of the portable object, the fifth control member being connected to the second detector of movement of the portable object to cause, when the second detector of movement of the portable object has detected movement of the portable object, the transmission of the first signal.

16. The method according to claim 1, wherein the action of locking comprises a data erasing action.

\* \* \* \* \*